UNITED STATES PATENT OFFICE 2,003,623

HETEROCYCLICALLY SUBSTITUTED PERHYDROCARBAZOLES

Max Bockmühl, Walter Krohs, and Gustav Ehrhart, Frankfort-on-the-Main, Germany, assignors to Winthrop Chemical Company, Inc., New York, N. Y., a corporation of New York No Drawing. Application March 31, 1932, Serial No. 602,400. In Germany April 4, 1931

2 Claims. (Cl. 260—45)

The present invention relates to organic compounds containing a heterocyclic hydrogenated radical, more particularly to compounds of the following general formula:

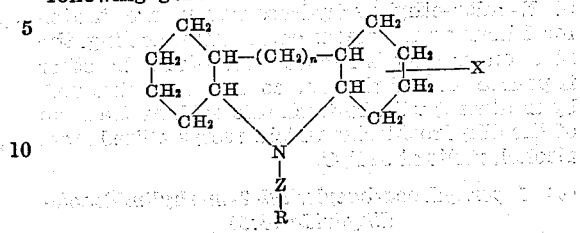

wherein $n$ means 0 or 1, Z stands for substituted or unsubstituted alkyl or alkoxy, R stands for a five-membered heterocyclic or hydrogenated heterocyclic radical containing nitrogen, and X may stand for alkyl or alkoxy substituting one of the hydrogen atoms of the $CH_2$-groups.

We have found that compounds of the above constitution are obtained by converting perhydrocarbazole or perhydroacridine compounds by exchanging their imine-hydrogen according to general known methods for a basic group, into compounds containing several nitrogen atoms in which the introduced nitrogen atom or atoms is or are bound by means of an aliphatic, cyclic or alicyclic radicle to the imino group of the perhydrogenated heterocyclic radicle, or by converting according to known methods suitable intermediate products, derived from perhydrocarbazole or perhydroacridine by substitution of the imine hydrogen, into such compounds containing several nitrogen atoms.

These substances can be produced, for instance, by causing perhydrocarbazole or perhydroacridine to react with a halogen-alkyl-amine, which may be used in the form of the free base or in the form of a salt. The new compounds can also be prepared from perhydrocarbazole or perhydroacridine in other ways, for instance, by converting these perhydrogenated heterocyclic compounds by means of an alkylene oxide, halogen hydrin or alkylene dihalide into the corresponding N-hydroxyalkyl- or N-halogen-alkyl-perhydrocarbazole- (or acridine) compound and causing the latter to react with a suitable basic compound containing a reactive group. As far as, for instance, N-aminoalkylperhydrocarbazole- (or acridine)-compounds are obtained, which still contain free hydrogen atoms in the amino groups, these compounds can further be caused to react with a compound containing a reactive group, for instance, containing halogen.

The N-hydroxyalkylperhydrocarbazoles, for instance, produced from perhydrocarbazole and halogen hydrins can be caused to react in the form of the alcoholates with a like result with compounds which contain a reactive halogen and either have a basic character or are capable of conversion into a compound of basic character by chemical transformation, for instance, by reduction.

From the foregoing, it will be understood that the member connecting the nitrogen of the perhydrogenated heterocyclic compounds with the introduced nitrogen may be of any nature. It may, for instance, be a simple aliphatic chain of carbon atoms, such as ethyl, propyl, which may be substituted, or a chain containing both carbon atoms and various other elements, such as oxygen, sulfur or nitrogen, for instance, ethoxy. The connecting member may likewise consist of a cyclic radicle or it may be a combination of a cyclic radicle with aliphatic groups. If the connecting member consists wholly or partly of a cyclic hydrocarbon residue, the perhydrocarbazole may also be caused to react with, for instance, an aromatic body containing nitrogen and a reactive halogen, such as, for instance, paranitrochlorobenzene, and the reaction product obtained may be further converted into a polyamino-compound. The perhydrocarbazole can also be converted into a polyamino-compound by means of other suitable intermediate products according to the methods above described or any other usual methods.

The new compounds are valuable therapeutic substances; they are in the form of the free bases compounds which are difficultly soluble or insoluble in water, and form hydrochlorides which are soluble in water.

The following examples illustrate the invention, the parts being by weight:—

(1) *1-perhydrocarbazylethylimidazole*

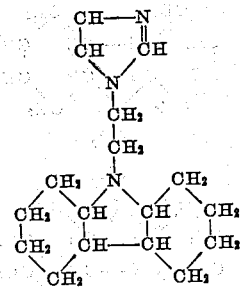

12 parts of chlorethylperhydrocarbazole and 7 parts of imidazole are heated for 2 hours on the steam bath. After cooling, the mass is mixed with water and caustic soda solution and the whole is extracted with ether. The other extract is dried, the ether removed and the residue distilled under reduced pressure. The perhydrocarbazylethylimidazole distills at 198° C.–205° C. at 3 mm. pressure and forms a dihydrobromide melting at 238° C.

(2) *1-perhydrocarbazylethyl-5-methylpyrazoline*

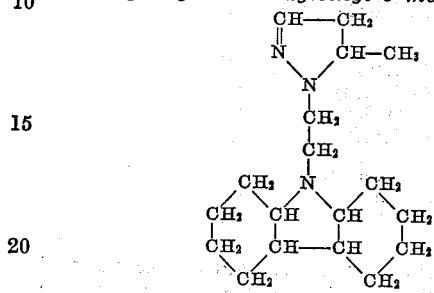

18 parts of chlorethylperhydrocarbazole and 13 parts of 5-methylpyrazoline are heated for 1 hour on the steam bath. After cooling the mass is mixed with water and caustic soda solution, the base is extracted with ether and purified by distillation under reduced pressure. The product is a yellowish oil which boils at 173° C.–180° C. at a pressure of 4 mm. It forms a monohydrobromide being a colorless substance which melts at 187° C.

(3) *8-perhydrocarbazyl-ethoxy-caffeine*

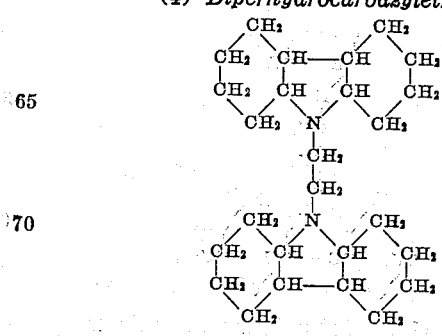

30 parts of N-hydroxyethylperhydrocarbazole, 5 parts of sodamide and 150 parts of toluene are heated to boiling for 2 hours, while stirring, 23 parts of chlorocaffeine are added in four or five portions, and the whole is heated to boiling for a further 8 hours. After cooling, the mass is mixed with water and the toluene solution is shaken with hydrochloric acid. The product is precipitated from the hydrochloric acid solution by means of sodium carbonate, and extracted with ether. The ethereal extract is dried by means of potassium carbonate, the ether is distilled and the residue is dissolved in acetone. On neutralizing the acetone solution with alcoholic hydrochloric acid a hydrochloride is obtained which, when recrystallized from water, melts at 221° C.

(4) *Diperhydrocarbazylethane*

6 parts of ethylene bromide, 24 parts of perhydrocarbazole and 25 parts of benzene are heated for 2 hours on the steam bath. The mass is then mixed with 100 parts of benzene, the separated perhydrocarbazole hydrobromide is filtered by suction and the benzene is removed from the filtrate by distillation. The residue is recrystallized from alcohol and constitutes the new base of melting point 111° C.

(5) *2-imino-3-perhydrocarbazyl-ethyl-4-methyl-thiazole-dihydride (4:5)*

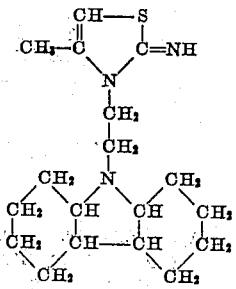

6 parts of 4-methyl-2-aminothiazole and 12 parts of N-chlor-ethyl-perhydrocarbazole are heated for 1 hour on the steam bath. After cooling, the reaction product is rubbed with ether, the ether is poured off and the new compound is obtained, by treatment with hydrochloric acid, in the form of the dihydrochloride which, recrystallized from alcohol, melts at 224° C.

(6) *1-perhydrocarbazylethyl-2-methylimidazole-dihydride (4:5)*

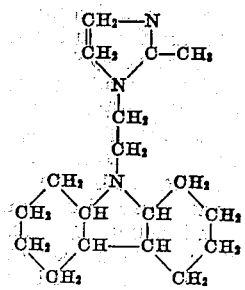

14 parts of 2-methylimidazoline and 18 parts of N-chlorethyl-perhydrocarbazole are heated for 2 hours on the steam bath. The reaction product is mixed with caustic soda solution and the new base is extracted with ether and purified by distillation under reduced pressure. It boils at 220° C. at 3 mm. pressure and forms a dihydrobromide melting at 211° C.

(7) *1-perhydroacridylethyl-5-methylpyrazoline*

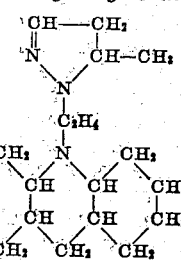

10 parts of 2-methylpyrazoline and 16 parts of chlorethylperhydroacridine are heated for one hour on the steam bath. The mass is then mixed with 100 parts of acetone and treated with alcoholic hydrochloric acid until the reaction to Congo paper is strongly acid. The dihydrochloride of the condensation product separates. Since it has a very strong acid reaction, the base is separated from its aqueous solution; it is extracted with ether, the ether residue is dissolved in acetic ester and mixed with such a quantity of alcoholic hydrochloric acid that the reaction to litmus paper is just alkaline. The monohydrochloride is precipitated which, after recrystallization from acetone and acetic ester, melts at 191° C.

We claim:
1. The 1-perhydrocarbazylethyl-5-methylpyrazoline of the following formula:

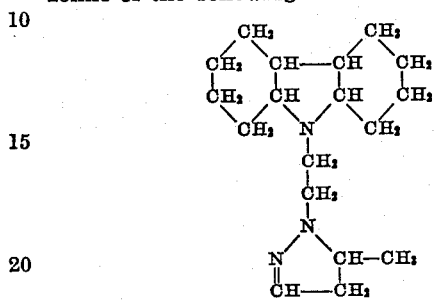

being a yellowish oil boiling at 173° C. to 180° C.

at a pressure of 4 mm., forming a monohydrobromide, a colorless substance melting at 187° C., said product being a useful therapeutic.

2. The compounds of the following formula:

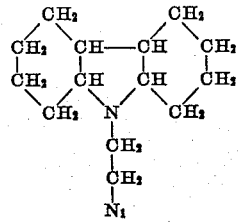

wherein $N_1$ is part of a five-membered heterocyclic unsaturated or saturated radical, said compounds being difficultly soluble or insoluble in water, forming hydrohalides soluble in water and being useful as therapeutics.

MAX BOCKMÜHL.
WALTER KROHS.
GUSTAV EHRHART.